United States Patent [19]

Worthing

[11] Patent Number: 4,817,264
[45] Date of Patent: Apr. 4, 1989

[54] FASTENER AND ASSEMBLY PROCESS
[75] Inventor: Albert L. Worthing, Tustin, Calif.
[73] Assignee: Shur-Lok Corporation, Irvine, Calif.
[21] Appl. No.: 83,066
[22] Filed: Aug. 10, 1987
[51] Int. Cl.$^4$ .............................................. F16B 19/04
[52] U.S. Cl. .................................... 29/512; 29/524.1; 29/525.2; 411/501
[58] Field of Search ...................... 29/509, 512, 522 R, 29/522 A, 526 A; 411/500, 501

[56] References Cited
U.S. PATENT DOCUMENTS

| | | | |
|---|---|---|---|
| 3,392,253 | 7/1968 | Adams et al. | 29/512 |
| 4,010,519 | 3/1977 | Worthing | 411/501 X |
| 4,461,191 | 7/1984 | Palamara | 29/512 X |
| 4,482,089 | 11/1984 | Lindahl et al. | 29/512 X |
| 4,557,100 | 10/1985 | Gorges | 411/501 X |

OTHER PUBLICATIONS
Shur-Lok Fasteners Catalog, 1986.

Primary Examiner—Howard N. Goldberg
Assistant Examiner—Taylor J. Ross
Attorney, Agent, or Firm—Edward D. O'Brian

[57] ABSTRACT

The method of affixing a fastener to a panel, said fastener comprising a body portion and a flange portion, said body portion comprising a thermoplastic material and being of a length greater than the thickness of said panel, comprising the steps of: inserting said fastener into and through said panel opening, whereby an end of said body portion of said fastener extends beyond the plane of the surface of the opposed side surface of said panel; and applying ultrasonic energy to said end of said fastener body portion for reshaping said end into a flange, said ultrasonic energy causing said end to flare over and contact said adjacent panel surface thereby sealing the panel against moisture entering the core space via the fastener installation hole. In a fastener of the type for mounting to a sandwich type panel and adapted to receive a bolt to attach external objects to said; said fastener having a body portion extending within said panel and having a flange portion external of said panel, the improvement comprising: said fastener body portion comprises a thermoplastic material and wherein said flange portion comprises a metal material and wherein the fastener contains a predetermined volume, V1, and is of a given weight, W1, and wherein the factor D1, defined as the weight, W1, divided by the volume, V1, is equal to or less than the density characteristic of the metal titanium.

11 Claims, 1 Drawing Sheet

U.S. Patent    Apr. 4, 1989    4,817,264
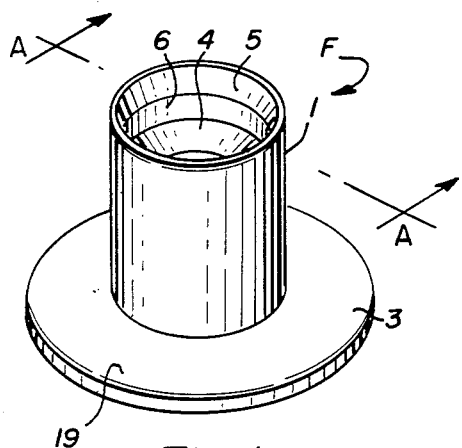
Fig_1
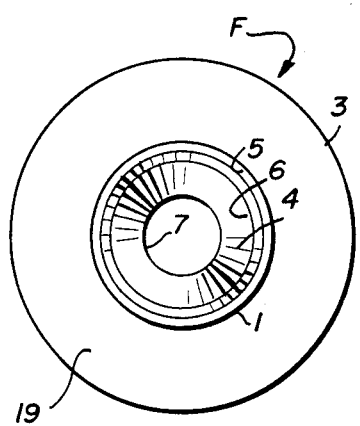
Fig_2
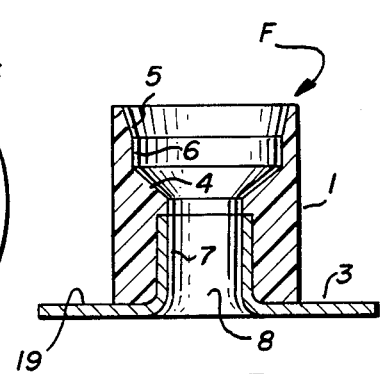
Fig_3
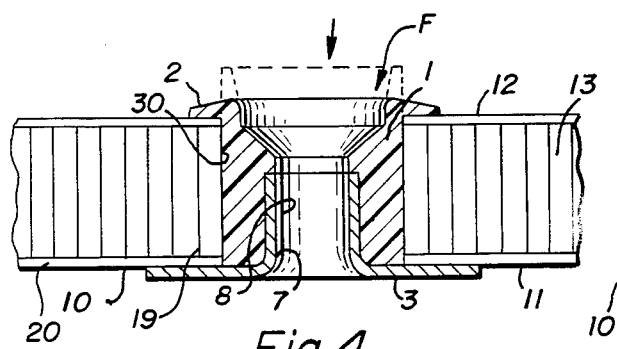
Fig_4
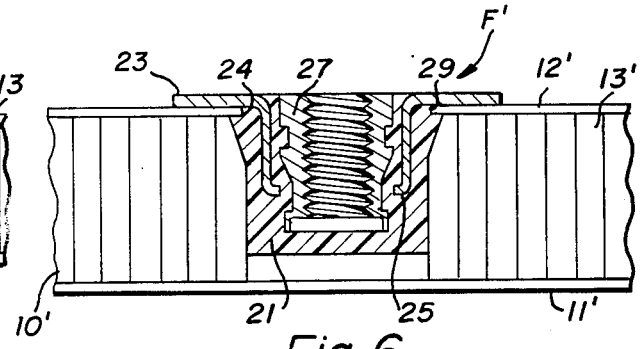
Fig_6
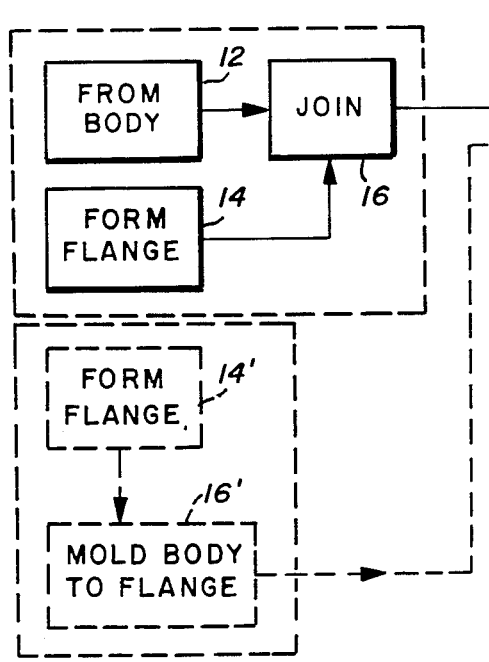
Fig_5
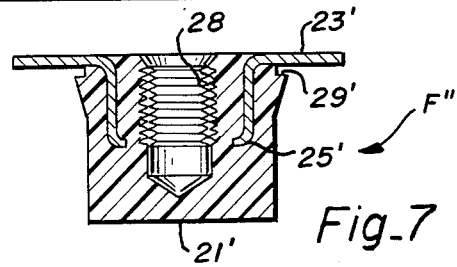
Fig_7
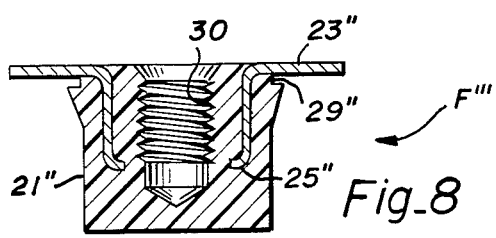
Fig_8

FASTENER AND ASSEMBLY PROCESS

FIELD OF THE INVENTION

This invention relates to fasteners and, more particularly, to fasteners employed in sandwich type panels. The invention also relates to a method of assembling and installing a fastener into a sandwich type panel.

BACKGROUND

Light weight panels formed of a sandwich of two facings and an intermediate "core" structure bonded together is a known structure that finds use, for example, as flooring in commercial aircraft. The sandwich panel flooring provides the high strength and stiffness and low weight characteristics desired in aircraft, for allowing greater operational efficiency. Panels of that type contain fasteners, which are also known devices, and which are affixed to the panel in a variety of ways. The fasteners permit bolts and other attaching devices to fasten the panel to support structure in the aircraft as well as to permit other structures and accessory airplane equipment to be supported on and maintained in a fixed location on the aircraft floor. A large variety of fasteners for that application has heretofore been marketed and sold by the Shur-Lok Company, Irvine, Calif., U.S.A., the assignee of the present invention.

Heretofore the sandwich panel has been constructed primarily of aluminum alloy or fiberglass reinforced plastic facings bonded to balsa wood, plastic foam, aluminum honeycomb, non-metallic honeycomb and paper honeycomb core materials. The fasteners designed for sandwich structure comprised of these materials were constructed entirely of a metal, specifically 2024-T4 or 6061-T6 aluminum alloy, possessing the light weight, strength, and formability qualities most desired in the application. More recent proposals for improvement in aircraft panel flooring specifies materials possessing greater specific strength and stiffness permitting a smaller volume or thickness of the panel, and, hence, lower weight, without sacrificing the strength and/or stiffness characteristic of the fiberglass reinforced plastic flooring which the new material is to replace. Specifically, the materials proposed are carbon/graphite fiber reinforced plastic materials. These are the materials whose efficacy in respect of enhanced operational efficiency in aircraft was demonstrated recently in the pioneering flight around the world taken by Mr. Rutan and Ms. Yeager on a single tank full of gas in the aircraft "Voyager".

All metals have a specific potential. When metals of different electrical potential are in contact in the presence of moisture, which serves as an electrolyte, a low energy electric current flows from the material of higher potential, or acting as the anode, to the material of lower potential, acting as the cathode. This is referred to as galvanic action. One result of this galvanic action is that corrosion of the metal having the higher potential, the anode, is accelerated.

Applicant has found that fasteners of aluminum, the noble material of higher electrical potential, of the kind now used in the fiberglass reinforced plastic panel flooring are subjected to galvanic corrosion and, hence, failure, when used in connection with the new panel materials, specifically the carbon/graphic fiber reinforced materials, which acts as the less noble material of lower electrical potential or cathode.

Possible solutions to this problem include adding an electrically insulated layer or coating to existing aluminum fasteners so as to electrically isolate the aluminum from the graphite. This does not seem a practical approach because of such coatings fracturing so as to expose the base metal so that it can corrode or because of problems of adhesives not adequately bonding to the coating, but its efficacy is not yet completely known. Another approach is to use a metal such as titanium or corrosion resistent steel, which have been found to be compatible with carbon graphite/fiber as a substitute for the aluminum in existing fastener structures in that those materials do not appear to corrode in that environment. The cost of titanium, however, is perhaps twelve times greater than the cost of aluminum while the weight of titanium is 1.6 times that of aluminum. Similarly, while the cost of austenitic stainless steel is approximately equal to that of aluminum, its weight is three times that of aluminum. The advantages which are obtained in using graphite fiber panels in aircraft would most certainly be traded against the very expensive titanium fasteners or the very heavy CRES steel fasteners. Because of the significant cost and/or weight increase, the substitution of titanium or corrosion resistent steel for aluminum in the fastener is not a satisfactory solution in applicants opinion.

A further solution to the problem is to substitute a plastic, specifically a thermoplastic resin including thermoplastic resins containing chopped glass or carbon/graphite fiber as a substitute for the aluminum in the existing fasteners. Although possessing compatibility with graphite fiber and being insusceptible to galvanic corrosion, the thermoplastic material does not satisfy the structural requirements imposed by the aircraft manufacturers: the fastener must withstand a significant load when applied to the floor panel spacer in the plane of the spacer flange, a shear force, and the typcial mode of failure is a tensile failure of the spacer body from the flange. The tensile strength of engineering plastics material known to applicant is approximately one-half the tensile strength of the aluminum alloy currently used in present commercially available fasteners. Although employing engineering plastics materials, the present invention does not compromise the load carrying capability of the installed fastener.

An object of the invention, therefore, is to provide a fastener compatible with carbon/graphite fiber reinforced floor paneling used in aircraft. A further object of the invention is to provide a fastener structure which avoids the serious galvanic corrosion effects found when existing aluminum fasteners are employed with graphite fiber reinforced panels. An additional object of the invention is to provide a fastener of a weight no greater than the weight of a corresponding titanium fastener. A still additional object of the invention is to provide a fastener that is of lower cost than existing aluminum fasteners so as to provide full economic benefit for the aircraft manufacturer using the new graphite fiber reinforced paneling materials as well as to provide an alternative to aircraft manufacturers who choose to continue with the existing glass fiber reinforced epoxy panels. A final object of the invention is to provide a new process as claimed for finally assembling and affixing a fastener into a honeycomb panel.

SUMMARY OF THE INVENTION

The present invention provides a fastener structure that is a hybrid or combination of a thermoplastic material and a metal, such as A286 corrosion resistant steel or commercially pure titanium alloy, in which the body portion is formed of engineering grade thermoplastic material and the flange portion is formed of low corrosion resistant steel type A286 or commercially pure titanium alloy.

A second aspect to the invention is a new assembly method. The novel method of affixing the fastener to the panel includes, following the step of inserting the fastener into the panel opening provided for the fastener, the step of applying ultrasonic energy to the end of the fastener projecting through the panel opening for flaring over the edge thereof into contact with and sealing to the surface of the panel in the area about the panel opening thereby preventing moisture from entering the core space of the panel.

The foregoing objects and advantages of the invention together with the structure characteristic of the invention, which was only briefly summarized in the foregoing passage, becomes more apparent to those skilled in the art upon reading the detailed description of a preferred embodiment of the invention, which follows in this specification, taken together with the illustrations thereof presented in the accompanying drawings.

BRIEF DESCRIPTION OF THE DRAWINGS

In the drawings:

FIG. 1 illustrates an embodiment in front perspective view;

FIG. 2 illustrates the embodiment in top plan view;

FIG. 3 is a section view taken along the section lines A—A in FIG. 1;

FIG. 4 is a partial section view of the fastener and panel following assembly;

FIG. 5 shows the steps of the method of assembling the fastener to the panel; and FIGS. 6, 7 and 8 illustrate in section view three related embodiments of the invention.

DETAILED DESCRIPTION OF A PREFERRED EMBODIMENT

Reference is made to FIG. 1 which illustrates an embodiment of the invention in perspective view. As illustrated, the fastener F includes a body portion 1 that is of a cylindrical outer geometry. The body portion 1 extends axially upwardly from a flange member or base 3. Body portion 1 includes an inner wall 5 which is tapered inwardly downwardly along the axis, to facilitate positioning there within of a bolt as later described. FIG. 2 illustrates a top plan view of the fastener F in which the elements previously identified by a numeral are identified in this view with the same numeral. Tapered wall 5 leads into the central circular passage 6. The internal details are better illustrated in FIG. 3, which is a section view of the embodiment of FIG. 1 taken along section lines A—A. As illustrated in FIG. 3, the flange member or base 3 contains an axially upwardly extending tubular portion 7, integrally formed with the radially extending base 3, and defining a passage 8 there through oriented coaxial with the passage in body portion 1. Tubular portion 7 is shorter in length than body portion 1 and, hence, extends only a short distance axially within the body portion.

Body portion 1 is formed of a thermoplastic material such as a thermoplastic resin. These are engineering plastics that have the desired qualities of high glass transition temperature, high strength, low creep and which are substantially non-corrosive, substantially non-toxic, substantially non-flammable and substantially non-smoke generating. Examples are "Ultem", polyetherimide; "Nylon", polyamide; and "Ryton", polyphenylene sulfide. Flange member 3 is of a metal material preferably A286 corrosion resistent steel or commercially pure titanium alloy. The flange is formed by any conventional metal forming technique, such as punching and stamping. The fasteners body portion is formed by customary plastic forming technique of casting or molding. Thus, for example, an injection mold is formed in the shape of member 1 and suitable heated thermoplastic resin composition is injected into the mold in which the plastic resin is allowed to harden. The body is subsequently removed from the mold and assembled ultrasonically together with the flange member in the configuration illustrated. An alternative technique is to incorporate within the mold a place for receiving flange member 3. Although more complicated tooling is involved, such a procedure allows the plastic body portion to be molded directly to the flange member.

The body portion 1 is attached to flange 3 and tubular portion 7 by adhesion of the molten plastic material comprising body portion 1 as it is injected into a mold containing the metallic flange. An alternative method for joining the metallic flange to a premolded fastener body is by ultrasonic insertion wherein the body portion 1 contains an internal cavity specifically designed to accept flange tubular portion 7. When flange 3 is excited ultrasonically, ultrasonic vibrations travel through flange 3 and tubular portion 7 to the interface of the metal component and thermoplastic body 1 where heat is generated causing the thermoplastic to melt momentarily permitting the metal component to be driven into place. The molten thermoplastic flows into the undercuts contained on the exterior surface of tubular portion 7. Upon solidification, the metal component is locked within the body portion 1.

As is apparent, the inner wall 5 is tapered downwardly and inwardly to facilitate postforming at the top end to the narrower section defined by the passage 8 in tubular section 7. The inner periphery is also shaped as shown, which allows the insertion of a bolt shank, not illustrated, through the fastener and provides a recessed seat for the bolt head, allowing the bolt head, not illustrated, to be received entirely within the confines of the fastener.

The process in which the fastener F panel 10 assembly is completed is charted symbolically in FIG. 5. The body portion 1 is formed by plastics molding techniques, as at 12, and the metal flange portion is formed by metal shaping and forming technique, as at 14, all of which is conventional, and the two pieces are ultrasonically joined together as represented at 16. The latter step may be combined with step 12, an alternative previously described. This alternative is represented by the alternative steps in the figure of forming the flange as at 14' and molding the body portion to the flange as at 16'.

The surface of the washer shaped portion of the flange element 3 which is used so as to abut the sandwich panel 10 is coated with an epoxy adhesive 19, which is the conventional practice, as at 18, and the fastener F is inserted into the selected hole 30 in the honeycomb panel 10 with the adhesive 19 on the member 3 abutting the panel surface as at 20. Simultaneously as represented at 22, ultrasonic energy and pressure are applied to the top end of the body portion 1, which softens the thermoplastic material in it and causes such material to flow.

The shape of the head of the ultrasonic energy applicator presses against the end of the body portion 1 to flare the latter over as indicated by the arrow in FIG. 4. This forms a flange like end 2 to the body portion 1 which seals to the surface of the panel 10 thereby preventing moisture from entering the core space of the panel as may be better understood from the illustration in FIG. 4 to which reference is made. The adhesive 19 is allowed to cure and form a firm bond between the panel and fastener.

FIG. 4 is a partial section view of the embodiment of FIG. 1 following assembly to a honeycomb sandwich panel 10. The sandwich panel 10 includes a pair of face surfaces 11 and 12 and an intermediate core structure 13 sandwiched between the surfaces and to which the surfaces are attached adhesively. The panel contains an opening 14 through which the fastener, specifically the main body portion 1, and the tubular portion of the flange member is inserted. The upper surface of flange member 3 is coated with the structural adhesive 19. As the fastener F is inserted, its movement through the passage 30 in the panel 10 is limited when the flange 3 and the adhesive 19 contact the bottom most panel face. The adhesive 19 forms a strong bond to secure the insert in place as well as to transfer load directly from the insert into the panel.

The upper end of body portion 3 is formed or flared over to define an integral annular flange like portion 2 in contact with the upper face. This is accomplished by applying ultrasonic energy to this end in accordance with the method previously described in FIG. 4. As indicated by the dotted lines, the length of the fastener is greater than the thickness of the honeycomb panel to allow sufficient material to form the flange as shown in the installed clamping configuration. The ultrasonic energy softens the end and causes the thermoplastic material to flow over and define a new shape, changing from the shape existing in FIG. 2, as is represented by the dotted lines in this Figure, prior to completion of the assembly. Any conventional ultrasonic welding machine or the like may be used with a specialized sonic applicator tool in this process of assembling the fastener to the honeycomb panel. In effect, the fastener is firmly retained within the panel.

In the specific embodiment of FIG. 1, a throughhole type fastener F or bolt spacer was presented. A second embodiment of the invention is presented in the form of a blind internally threaded fastener F′, which is illustrated in section view in FIG. 6 as finally assembled in a panel 10′ to which reference is made.

A blind fastener is one which does not extend entirely through the panel. Instead it is inserted into the panel hole from one side, the same side on which a fastening bolt is to be installed, and affixed in place. As shown in FIG. 6, the fastener F′ contains a generally conical body 21 and a flange member 23. The body 21 end which abuts the flange contains a groove 29 on its outer surface the diameter of which is slightly smaller than the diameter of the installation hole in the sandwich panel and the width of which is slightly larger than the thickness of the panel facing. Additionally, the diameter of conical body 21 at its small end is slightly smaller than the diameter of the installation hole in the sandwich panel 10′ while the diameter of conical body 21 at its large end is slightly larger than the diameter of the installation hole in the sandwich panel 10′.

The conical body 21 serves to provide a snap-in-place fit in the sandwich panel installation hole thereby fixturing the fastener within the sandwich panel while an epoxy adhesive applied to the under surface of flange 23 is permitted to cure thereby firmly joining the fastener to the panel facing as in the prior embodiment. The body is of thermoplastic material and the flange member is of corrosion resistant A286 or commercially pure titanium alloy, as in the prior embodiment.

The flange member 23 contains a tubular extending portion 25, extending coaxial of a passage in body 21, and the end of the tubular portion contains an inwardly protruding rim portion 25 that extends peripherally about the axis. The rim serves to assist holding the flange and body portion together, acting as an anchor. In this embodiment, the flange is attached to the mold used to form body 21. This allows the plastic to form around and capture the tubular portion. An ultrasonically installed internally threaded socket 27 is located coaxial of the body and there within, leaving an open end flush with the plane defined by the annular flange base. A bolt, not illustrated, may thus be inserted within and screwed into place in the fastener. The outer surface of the socket 27 has a serrated or irregular surface much like the geometry of conventional wall anchors so as to anchor the socket in place in the plastic body and prevent its withdrawal against a pulling force.

In this embodiment, however, the socket 27 is treated with ultrasonic energy to melt the plastic at the interface of socket 27 and body portions 21 thereby allowing insertion of socket 27 into place as shown, following which step the ultrasonic energy is withdrawn and the thermoplastic material again hardens. The result is a blind type fastener 10′ which may be threaded in any conventional manner combining two different materials, a hybrid, suitable for the purposes previously described, in the assembly of which changes a portion of its geometry through application of ultrasonic energy.

A second embodiment of the blind fastener F″ is shown in section view in FIG. 7 wherein the internally threaded socket 27 is replaced by a metallic screw-in-place 28 insert which contains threads on both its external and internal surfaces. Conical body 21′ is prepared with an internally threaded hole coaxial with the body centerline which is sized to mate with the external thread on the screw-in-place insert. When intalled, the screw-in-place insert is located coaxially of the body and leaves an open end essentially flush with the plane defined by the annular flange base. A bolt may thus be inserted within and screwed into place in the fastener. In all other respects, the structure of this version of blind fastener is the same as that of FIG. 6.

A third embodiment of the blind fastener F‴ is shown in section view in FIG. 8 wherein the internally threaded socket 27 in FIG. 6 or the metallic screw-in-place insert 28 in FIG. 7 are replaced by a direct molded internally threaded hole 30 coaxial with the body centerline which is sized to mate with the external thread of a bolt, screw or other externally threaded fastener.

In the embodiments, the internal thread of the socket 27, the screw-in-place insert 28 and the direct molded internally threaded hole 30 may or may not be threadlocked to prevent loosening of the externally threaded bolt or screw engaging the blind fastener. The weight of the fasteners described is the same as or less than the weight of a fastener made of titanium to the same dimensions. Thus the weight of the fastener, including all metal and plastic portions, mathematically divided by the volume of the fastener gives an equivalent density factor, D1, that is less than or equal to the density of titanium.

It is believed that the foregoing description of the preferred embodiment of the invention is sufficient in detail to enable one skilled in the art to make and use the invention. However, it is expressly understood that the details of the elements which are presented for the foregoing enabling purpose is not intended to limit the scope of the invention, in as much as equivalents to those elements and other modifications thereof, all of which come within the scope of the invention, become apparent to those skilled in the art upon reading this specification. Thus the invention is to be broadly construed within the full scope of the appended claims.

What is claimed is:

1. In combination with a sandwich panel of the type containing first and second parallel spaced face surfaces, and a core structure intermediate said top and bottom surfaces forming a sandwich construction of a predetermined thickness, and said panel further containing at least one hole there through for receiving a fastener, the fastener comprising:

a generally cylindrical body portion, said body portion having a height greater than the thickness of said panel and containing an axial passage for permitting extension of a bolt shank there into, said body portion further comprising a thermoplastic material, said thermoplastic material having the characteristic of softening responsive to the application of ultrasonic energy thereto, said body portion further including, and integrally formed flange portion extending about the upper end peripheral of said axial passage for bonding attachment to a first face of said panel in the region extending about the inert hole in said panel, flange means, said flange means being of a different material than said body portion and containing a washer shaped base of a predetermined diameter having a central opening and containing an upwardly extending tubular portion, said upwardly extending tubular portion being coaxial of said passage in said body portion and coaxial of and located within said axial passage and attached to said walls defining said body portion axial passage, said tubular portion of said flange means being of a predetermined length, which length is less than the thickness of said panel and less than the length of said body portion, said flange means consisting of a metal material having a density greater than the density of the metal aluminum, said body portion and said flange means together defining a predetermined volume and predetermined weight and density factor defined as said predetermined weight divided by said predetermined volume, and wherein said density factor is lesser than or equal to the density factor of the metal titanium.

2. The invention as defined in claim 1 wherein:
said washer shaped based portion contains adhesive means on an upperside surface thereof for attaching said flange means to a face of said panel.

3. In a fastener of the type for mounting to a sandwich type panel and adapted to receive a bolt to attach external objects to said sandwich type panel; said fastener having a body portion extending within said panel and having a flange portion external of said panel, the improvement comprising:

said fastener body portion comprises a thermoplastic material and wherein said flange portion comprises a metal material and wherein the fastener contains a predetermined volume, V1, and is of a given weight, W1, and wherein the factor D1, defined as the weight, W1, divided by the volume, V1, is equal to or less than the density characteristic of the metal titanium.

4. The fastener as defined in claim 3 wherein said thermoplastic material is material selected from the class consisting of: polyetherimide, polyamide, and polyphenylene sulfide.

5. The invention as defined in claim 3 wherein:
said metal consists of titanium.

6. The invention as defined in claim 3 wherein:
said fastener body portion contains a central passage and said central opening contains a bolt thread for permitting a bolt to be screwed into said passage.

7. The invention as defined in claim 3 wherein:
said fastener body portion contains a central passage and a metal insert of generally cylindrical shape coaxial of said passage, said insert having external threads for screwing into said central passage and internal threads for permitting a bolt to be screwed into said insert.

8. The invention as defined in claim 3 wherein:
said fastener body portion contains a central passage and a metal insert of a generally cylindrical shape anchored within said passage, said insert having internal screw threads for permitting a bolt to be screwed into place within said insert.

9. The invention as defined in claim 3 wherein:
said metal is a member selected from the class of titanium and steel.

10. The invention as defined in claim 4 wherein:
said metal is a member selected from the class of titanium and steel.

11. The method of affixing a fastener to a panel, said fastener comprising a body portion and a flange portion, said body portion comprising a thermoplastic material and being of a length greater than the thickness of said panel, said panel containing an opening for receiving there within said body portion of said fastener and preventing the movement there through of said flange portion, comprising the steps of:

inserting said fastener into and through said panel opening until fastener movement is blocked by said flange being against the panel, whereby an end of said body portion of said fastener extends beyond the plane of the surface of the opposed side surface of said panel and said adhesive is against said panel, applying ultrasonic energy to said end of said fastener body portion for reshaping said end into a flange, said ultrasonic energy causing said end to flare over and contact said adjacent panel surface thereby sealing the panel against moisture entering the core space via the fastener identification hole and adhesively fastening said flange to one surface of said panel,, applying an adhesive material to a surface of said flange portion adjacent to said panel, and curing said adhesive.

* * * * *